United States Patent [19]
Grivel et al.

[11] Patent Number: 5,709,965
[45] Date of Patent: Jan. 20, 1998

[54] ELECTRICAL INTERCONNECTION SYSTEM FOR ELECTROCHEMICAL GENERATORS AND BATTERIES

[75] Inventors: Tristan Grivel, Bordeaux; Denis Ristord, Martignas, both of France

[73] Assignee: SAFT, Romainville, France

[21] Appl. No.: 420,761

[22] Filed: Apr. 12, 1995

[30] Foreign Application Priority Data

Apr. 13, 1994 [FR] France ................... 94 04395

[51] Int. Cl.$^6$ ................... H01M 2/26
[52] U.S. Cl. ........... 429/158; 429/161; 429/178; 429/211
[58] Field of Search ........... 429/211, 161, 429/160, 158, 178

[56] References Cited

U.S. PATENT DOCUMENTS

| | | |
|---|---|---|
| 2,896,981 | 7/1959 | Cooney . |
| 4,209,576 | 6/1980 | Heurtel ................... 429/211 X |
| 4,306,004 | 12/1981 | Kaun et al. ................... 429/211 |
| 4,521,498 | 6/1985 | Juergens ................... 429/161 X |
| 5,047,300 | 9/1991 | Juergens ................... 429/94 |
| 5,149,605 | 9/1992 | Dougherty ................... 429/161 X |
| 5,238,757 | 8/1993 | Suzuki et al. ................... 429/94 |

FOREIGN PATENT DOCUMENTS

| | | |
|---|---|---|
| 0170985 A1 | 2/1986 | European Pat. Off. . |
| 1495258 | 9/1967 | France . |
| 2111047 | 6/1972 | France . |
| 446466 | 3/1968 | Switzerland . |

OTHER PUBLICATIONS

*Patent Abstracts of Japan*, vol. 9, No. 8 (E-289) (1731) 12 Jan. 1985 & JP-A-59 157 955 (Shinkoube Denki K.K.) Sep. 1984.

French Search Report FR 9404395, Jan. 1995.

*Primary Examiner*—John S. Maples
*Attorney, Agent, or Firm*—Sughrue, Mion, Zinn, Macpeak & Seas, PLLC

[57] ABSTRACT

An electrical interconnection system for electrochemical generators including electrodes and connection members providing continuity of electrical current flow from the electrodes to the exterior of said generators connects the electrodes to the connection members and the connection members to each other by means of a mechanical and electrical joint. In an area in which there is initially a substantially plane contact surface between the parts to be joined, the joint is in the form of a plastic deformation of the parts to be joined and is situated at a sufficient distance from the edges of the parts for the edges not to be deformed. The plastic deformation consists in cold flow of the material of the parts in parallel directions in the same sense which immobilizes the parts relative to each other, only the parts contributing to the joint and being in intimate contact throughout the area subject to deformation.

10 Claims, 5 Drawing Sheets

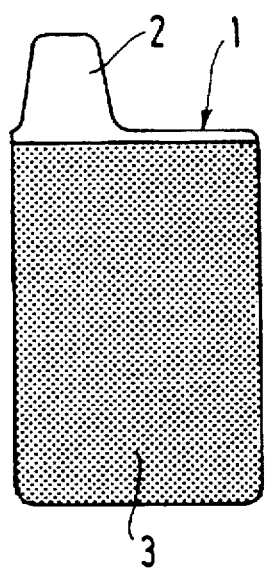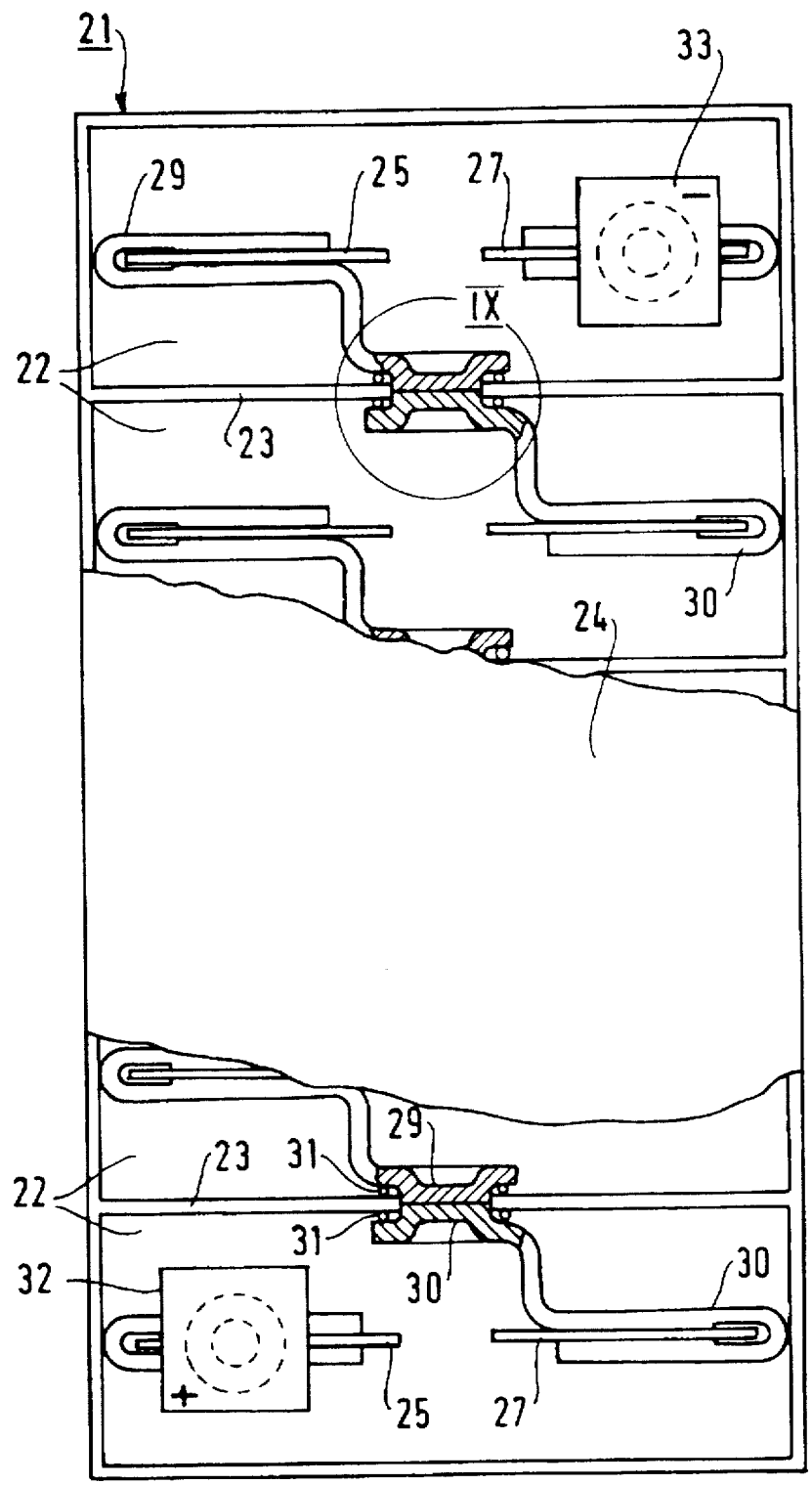

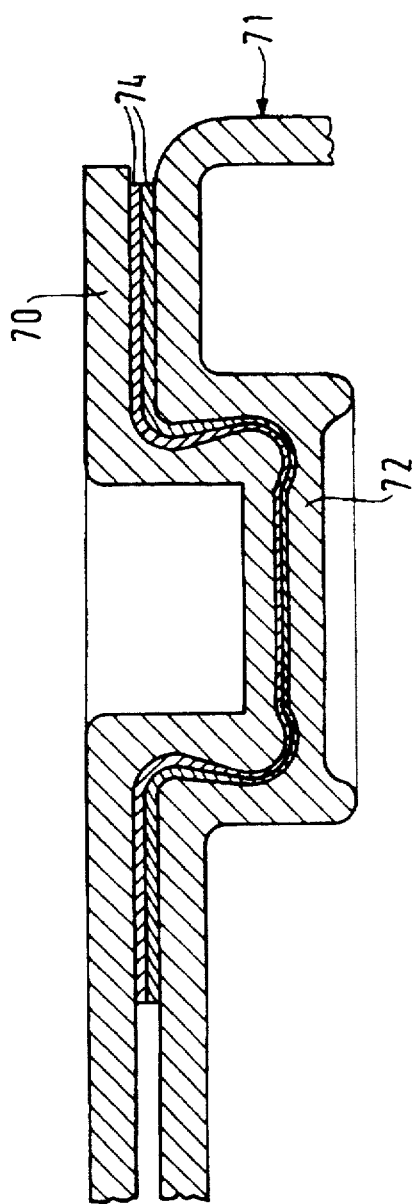
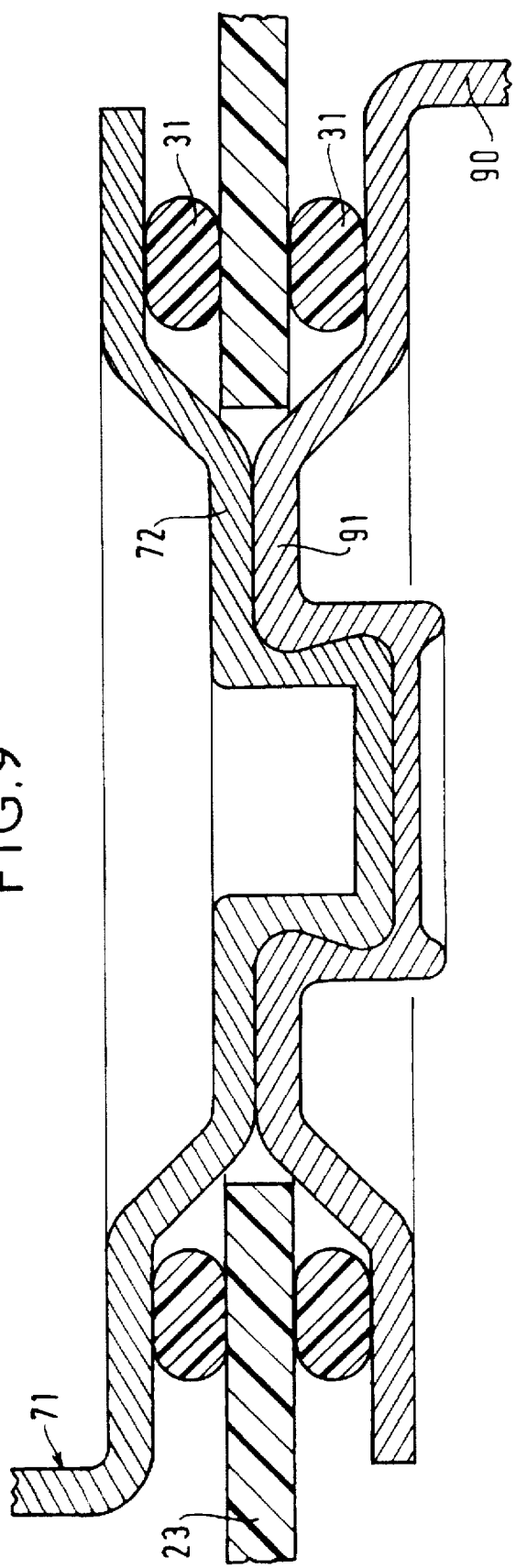

ELECTRICAL INTERCONNECTION SYSTEM FOR ELECTROCHEMICAL GENERATORS AND BATTERIES

BACKGROUND OF THE INVENTION

1. Field of the Invention

The present invention concerns an electrical interconnection system intended to be used in electrochemical generators, possibly assembled into batteries. This system is more particularly suitable for electrical interconnection of monoblock accumulators or accumulator batteries.

2. Description of the Prior Art

The electrical interconnections of an electrochemical generator principally include connections between the electrodes of the same polarity and the corresponding current output terminal, either directly or via a separate connection member. A connection of this kind is usually made by means of a compression joint (belt, screw or rivet), or welded (electrically spot welded, for example). A compression joint, for example using a nut and bolt and washers, the seal being provided by gaskets if necessary, has the drawback of the bolt remaining under tension which makes the joint fragile and in particular susceptible to corrosion. A welded joint raises the problem of the tolerance in the positioning of one part relative to the other. It is always difficult to make a weld of good mechanical and electrical quality and this also requires careful preparation of the parts to be welded.

In an accumulator battery it is necessary to connect each electrode of each accumulator to the opposite polarity electrode of a contiguous accumulator. This connection can be direct or indirect via one or more separate connection members. A connection of this kind is usually made by means of a compression joint (bolt, screw or rivet) or a mechanical interference fit. It is not feasible to use a welded joint as the need to weld inside the container in the case of connections between connection members entails the risk of splashing the container with slag during the welding operation.

In a monoblock type design, for example, in which the accumulator cells are contained in compartments of a single container, the electrodes of the contiguous accumulators are connected by intercell connection members in an area in which the electrically insulative wall separating two accumulators has a hole through it. The use of a compression joint in the case of a connection between the intercell connection members of two contiguous accumulators has the drawback of requiring a double seal and of close control of the compression torque. High accuracy in the manufacture of the parts is indispensable. In a mechanical interference fit joint, binding problems can occur which cause deterioration of the electrical contact and are hazardous to the safety of the user.

The present invention is particularly concerned with an electrical interconnection system for accumulators which is mechanically and electrically reliable and which is easier to use than prior art systems.

SUMMARY OF THE INVENTION

The present invention consists in an electrical interconnection system for electrochemical generators including electrodes and connection members providing continuity of electrical current flow from the electrodes to the exterior of said generators, said electrodes being connected to said connection members and said connection members being connected to each other by means of a mechanical and electrical joint, wherein in an area in which there is initially a substantially plane contact surface between the parts to be joined, said joint is in the form of a plastic deformation of the parts to be joined and is situated at a sufficient distance from the edges of said parts for said edges not to be deformed, said plastic deformation consisting in cold flow of the material of said parts in parallel directions in the same sense which immobilizes said parts relative to each other, only said parts contributing to said joint and being in intimate contact throughout the area subject to deformation.

By plastic deformation is meant deformation in a range beyond the elastic limit of the material. The parts to be joined are superposed over part of their surface and the joint is made in this area. It must be at a sufficient distance from the edges of each of the parts to be joined because if any of the edges forms any part of the joint, since its deformation is difficult to control, this will weaken the joint. The deformation of the parts must be of a similar shape for each of them so that the mechanical and electrical quality of the joint is ensured by intimate contact of all the parts. The cold flow of the excess material prevents any relative movement of the parts and ensures that they are firmly joined. This produces a joint which cannot be demounted and in which the parts are abutted against each other.

Only the parts to be joined participate in the joint, which does not require any additional part or any additional material. The parts joined remain individually identifiable in the joint.

In one embodiment, in an electrochemical generator the joint connects the electrodes of the same polarity to a current output terminal.

In another embodiment, in an electrochemical generator the joint connects the electrodes of the same polarity to a connection member connected to a current output terminal.

In a further embodiment, in a battery the joint connects in a first accumulator the electrodes of the same polarity to the connection members, in a second accumulator the connection members to the opposite polarity electrodes, and the connection members of the first accumulator to the connection members of the second accumulator. This is the case in particular of a monoblock accumulator battery in which each accumulator is housed in a compartment of a battery container. The accumulators are electrically connected to the contiguous accumulators by means of connection members passing through the common wall.

In one embodiment at least one backing part is superposed on the parts to be joined. The backing part can be independent of or fastened to one of the parts to be joined. The use of one or more backing parts is particularly indicated in the case where the parts to be joined have insufficient mechanical strength compared to the other parts (very thin sheet metal parts, for example).

The method of implementing the interconnection system of the present invention produces a joint at room temperature in a single operation, the parts to be joined being placed in contact over a substantially plane surface and placed between a punch and a die in their area of contact. Pressure is applied through the intermediary of the punch so as to bring about plastic deformation by cold flow of the material of the parts to be joined in parallel directions in the same sense, which immobilizes the parts relative to each other.

A punch and die system is defined in the present application as a male part having an upstanding imprint, the punch, and a female part having a recessed imprint, the die. Accordingly, the punch can be engaged in the die and pressure applied to one or more parts placed, between the punch and the die to confer a particular shape on them.

An advantage of the present invention is that the joint is made using parts manufactured by relatively crude methods which are less costly than the methods used in the prior art, such as pressing or forming, for example. The relative positioning of the parts is not critical and can be obtained by simple abutment. It is possible to use parts of different thicknesses and/or different materials (steel and copper, for example). However, for a good quality joint it is desirable not to join parts whose total thickness exceeds 6 mm. It is possible to work inside the container of the accumulator as there is no risk of splashing. Finally, the joint when made can be checked immediately.

The interconnection system of the present invention applies in particular to a monoblock nickel-cadmium accumulator battery used in traction (railroad or automobile) and emergency power (lighting) applications. The monoblock design achieves a substantial improvement in terms of energy per unit volume and energy per unit mass which is particularly advantageous in the case of an electric vehicle. The use of this interconnection system further improves the characteristics of this product in terms of cost and reliability.

Other features and advantages of the present invention will emerge from the following description of typical embodiments of the invention given by way of non-limiting illustrative example only and from the appended drawings.

BRIEF DESCRIPTION OF THE DRAWINGS

FIG. 1 shows a nickel-cadmium prismatic accumulator electrode with its plate header.

FIG. 2 is a plan view of a monoblock accumulator battery before making the interconnections.

FIG. 8 is a view in section on the line VIII—VIII in FIG. 7 showing a connection between electrodes and the intercell connection member from FIG. 7.

FIG. 9 is a sectioned view of the part IX of FIG. 2 when a connection has been made between two intercell connection members similar to that of FIG. 7.

DETAILED DESCRIPTION OF THE PREFERRED EMBODIMENTS

Figure 3:
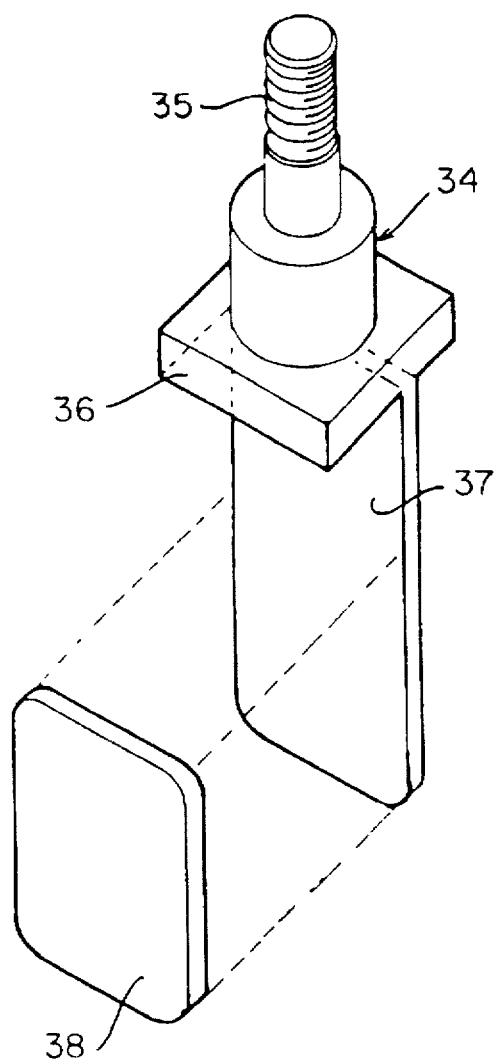
FIG. 3 is a perspective view of a current outlet terminal and an independent backing part.

FIG. 1 shows an electrode 1 used in nickel-cadmium accumulators of rectangular prismatic shape. The electrode has a plate header 2 which is not covered with active material 3. The plate header 2 is made from 0.1 mm thick nickel-plated steel strip. The thickness of the plate header can vary depending on the application, being usually between 0.1 mm and 1 mm inclusive. The plate headers 2 are used to connect the electrodes 1 of the same polarity to the corresponding current output terminal either directly or via a separate connection member.

In a monoblock battery in which a plurality of accumulators are joined together, each electrode of one polarity of each accumulator is connected to the electrode of opposite polarity of the contiguous accumulator via an intercell connection member which passes through the wall common to the two accumulators. FIG. 2 shows a battery of this kind before the interconnections are made. The monoblock battery 21 is made up of accumulators 22 placed in compartments delimited by walls 23 and covered by a common lid 24. The plate header 25 of the positive electrode of each accumulator 22 is connected to the plate header 27 of the negative electrode of the adjacent accumulator. The positive plate headers 25 are grouped together and fixed to a connection member 29; similarly the negative plate headers 27 are fixed to a connection member 30. The connection members 29 and 30 are in contact with each other through an orifice in the wall 23 common to two compartments. A seal between the two compartments is provided by O-rings 31. The plate headers 25 and 27 of the electrodes of the accumulators 22 at the ends of the battery 21 are electrically linked to the positive and negative current output terminals 32 and 33, respectively, which are usually of similar shape.

FIG. 3 shows a current output terminal 34. It includes a screwthreaded part 35 for connecting the battery to an external circuit, a base 36 for fixing it to the lid 24 of the battery 21 and a bottom part 37. An independent backing part 38 can be associated with it.

Figure 4:
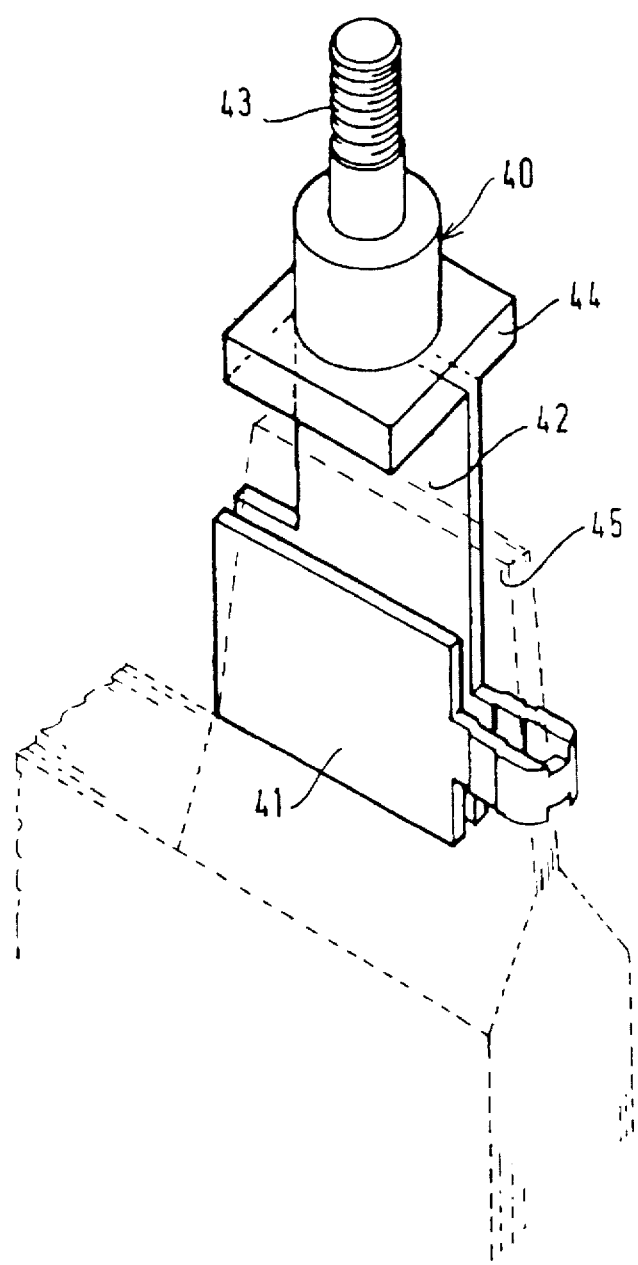
FIG. 4 is a perspective view of a current output terminal which has a backing part fastened to the bottom part of the terminal.

FIG. 4 shows a current output terminal 40 carrying a backing part 41 fixed to the bottom part 42. It has a screwthreaded part 43 for connecting the battery to an external circuit and a base 44. The bottom part 42 and its backing part 41 grip the plate header 45 of the electrode. The terminal 40 and its backing part 41 can be made, for example die-stamped, in one piece.

Figure 5:
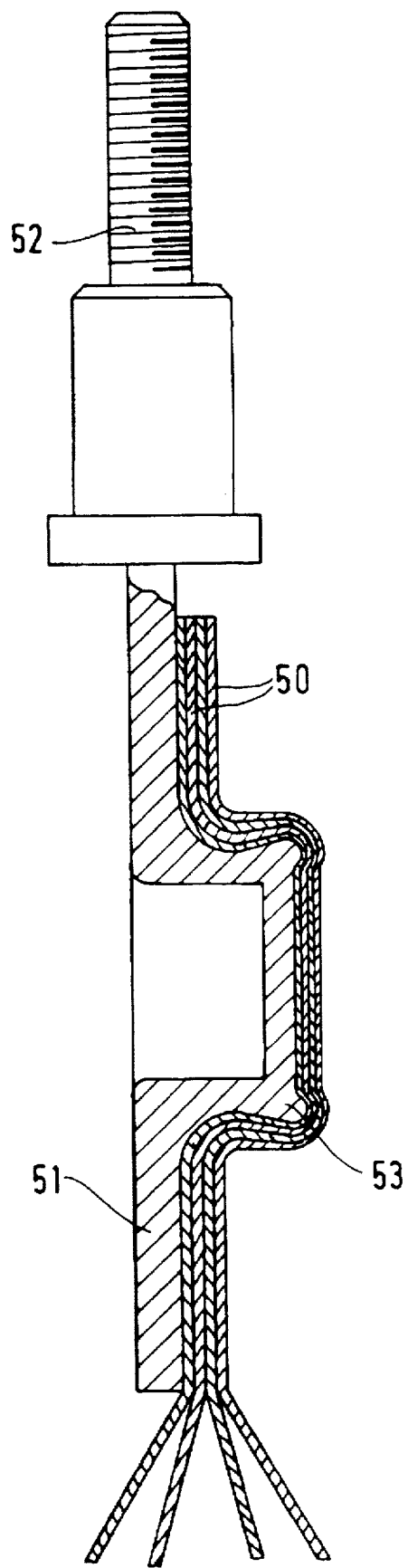
FIG. 5 is a part-sectioned view of an electrical interconnection system in accordance with the present invention at the level of the connection between the electrodes and a current output terminal similar to that of FIG. 3.

FIG. 5 shows in section the joint between the plate headers 50 of four electrodes of an electrochemical. generator and the bottom part 51 of a current output terminal 52 similar to that shown in FIG. 3. This joint provides electrical continuity from the interior to the exterior of the electrochemical generator. FIG. 5 shows the case in which the plate headers 50 are outside the joint but they could equally well be inside the joint.

The joint between the electrodes and the bottom part of the terminal can be made by crushing a part of the area in which the plate headers 50 are superposed with the bottom part 51 of the terminal between a punch and a die, for example, and applying pressure to cause cold flow of the material of the parts to be joined. This forms a bead 53 which fastens together the parts 50 15 and 51. This method has the advantage that it can be used cold which prevents damage to components near the joint.

A joint of this kind between the nickel-plated steel plate headers of sixteen electrodes and the nickel-plated copper bottom part of the terminal has been made using a punch with an outside diameter of 6 mm and a die with an inside diameter of 10 mm, for example. The thickness of the bottom part of the terminal was 1.5 mm and that of each of the plate headers was 0.1 mm. The operation was carried out at a pressure of 8 tonnes ±1 tonne applied briefly. In section it can be seen that the plate headers and the bottom part of the terminal are perfectly discernible (the mating planes can be seen) and in intimate contact in all of the area that has been deformed. A voltage drop measurement has been carried out at 200 A between the plate headers and the terminal. If two joints are made between these parts the voltage drop measured is in the same order of magnitude (30 mV to 35 mV) as that obtained with conventional jointing systems such as welding.

To obtain a firm joint it is possible to use a nickel-plated steel or nickel-plated copper backing part superposed on the parts to be joined, as shown in FIG. 3 or FIG. 4. The plate headers are then preferably disposed between the backing part and the bottom part of the current output terminal.

To prevent problems of parts rotating relative to each other in the case of a joint of cylindrical symmetry, two joints can be made close together. These joints are side by side and optionally in the same direction.

Figure 6:
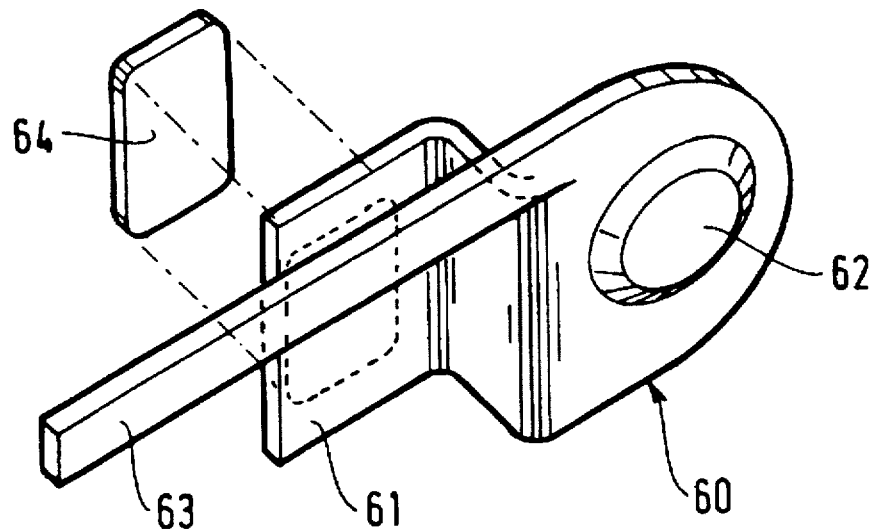
FIG. 6 is a perspective view of an intercell connection member and an independent backing part.

FIG. 6 is a perspective view of an intercell connection member 60 made from copper plate or nickel-plated steel plate. It has a plane part 61 adapted to be joined to the plate headers of the electrodes and a protruding part 62 adapted to be joined to another intercell connection member. The connection member 60 further includes a bar 63 enabling it to be located correctly in the accumulator container by locating against bosses formed on the walls. A backing part 64 can be added independently of the connection member 60.

A joint of this kind between the nickel-plated steel plate headers of sixteen electrodes and a nickel-plated copper intercell connection member has been made using a punch with an outside diameter of 6 mm and a die with an inside diameter of 10 mm, for example. The thickness of the connection member was 1.5 mm and that of each of the plate headers was 0.1 mm. The operation was carried out at a pressure of 8 tonnes±1 tonne. The plate headers and the intercell connection member are perfectly discernible and in intimate contact throughout the area subject to deformation.

Figure 7:
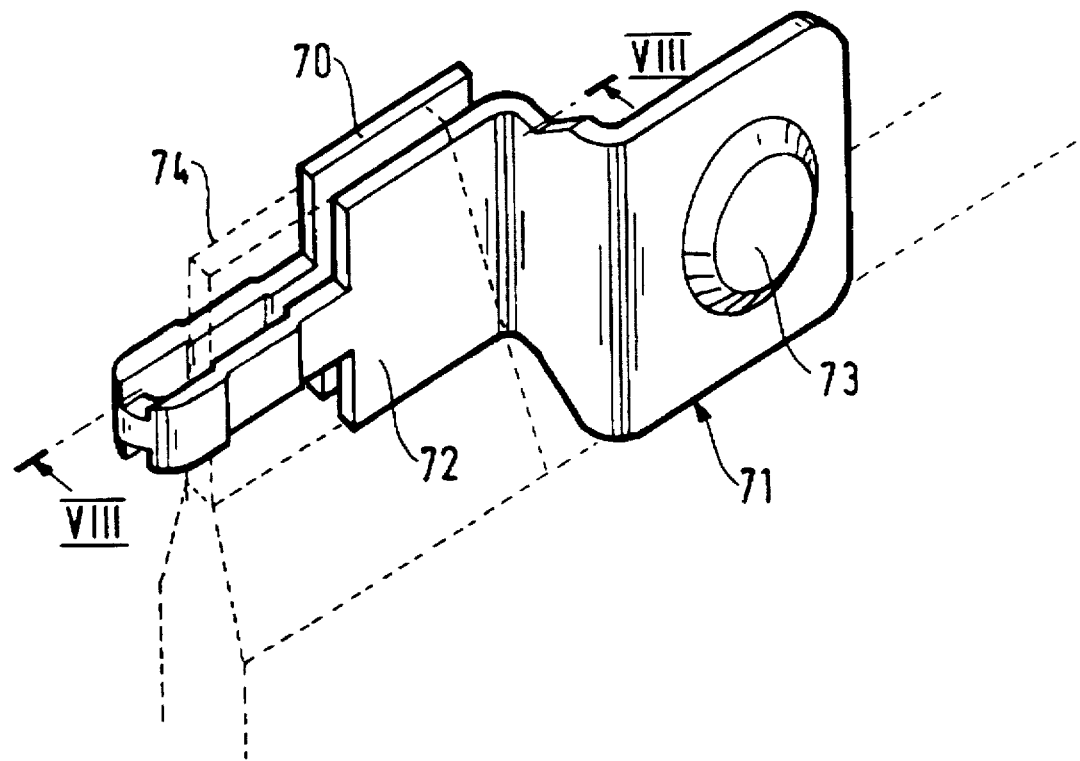
FIG. 7 is a perspective view of an intercell connection member with a backing part attached to it.

FIG. 7 shows a backing part 70 linked to the intercell connection member 71. It can be made by stamping and bending. The connection member 71 also includes a plane part 72 adapted to be joined to the plate headers of the electrodes and a protruding part 73 for the joint to another connection member. The plate header 74 of the electrode is between the plane part 72 and the backing part 70.

FIG. 8 shows in section the joint between the 1.5 mm thick plane part 72 of the connection member 71, the backing part 70 which is the same thickness and the plate header 74 of two electrodes. The joint between an intercell connection member and the plate header of 16 electrodes has been made using a punch with an outside diameter of 5 mm and a die with an inside diameter of 8 mm. The operation was carried out at a pressure of 5 tonnes±1 tonne. In section it can be seen that the plate headers, the plane part and the backing parts are perfectly discernible and in intimate contact throughout the area subject to deformation.

FIG. 9 shows in section the interconnection of two intercell connection members 71 and 90 each joined to different polarity electrodes of two contiguous accumulators. The joint is on the plane parts 72 and 91 respectively of the two 1.5 mm thick connection members 71 and 90. The joint was made using a punch having an outside diameter of 5 mm and a die having an inside diameter of 8 mm. The operation was carried out at a pressure of 5 tonnes±1 tonne. The final thickness obtained at the center of the joint was 0.8 mm. In section it can be seen that the two connection members 71 and 90 are perfectly discernible and in intimate contact throughout the area subject to deformation.

A voltage drop measurement has been carried out at 200 A between the plate headers of the electrodes of an accumulator and that of the contiguous accumulator, the plate headers being linked by two intercell connection members themselves linked in the same manner. If a double joint is made between these parts, the voltage drop measured is in the same order of magnitude (16 mV to 17 mV) as that obtained with conventional jointing systems such as welding associated with bolting.

The interconnection system of the present invention can include one of the joints described and shown hereinabove: current output terminal-electrode joint, intercell connection member-electrode joint or joint between connection members, but it can equally well include two, or even three of these joints.

Of course, the present invention is not limited to the embodiments described and shown but is open to numerous variations that will suggest themselves to the person skilled in the art and which do not depart from the scope of the invention. In particular, the interconnection system of the present invention can be applied to any type of generator or battery regardless of its geometrical shape or the electrochemical combination used.

There is claimed:

1. Electrical interconnection system for electrochemical generators including electrodes and connection members providing continuity of electrical current flow from the electrodes to an exterior of said generators, said system characterized in that said electrodes are connected to said connection members by means of mechanical and electrical joints, wherein each joint comprises a deformation area in which there is initially a substantially plane contact surface between a connection member and the electrodes to be joined, said connection member and the electrodes joined to it having been plastically deformed together in a common direction in said deformation area to form said joint, and wherein said joint is situated at a sufficient distance from edges of said electrodes and said connection members such that said edges are not deformed, said plastic deformation comprising cold flow of material of said electrodes and said connection members in parallel in said common direction, thereby immobilizing said electrodes and said connection members relative to each other, only said electrodes and said connection members contributing to said joint and being in intimate contact throughout the area subject to deformation.

2. System according to claim 1 wherein said joint connects said electrodes of a same polarity to a current output terminal.

3. System according to claim 1 wherein said joint connects said electrodes of a same polarity to a connection member linked to a current output terminal.

4. System according to claim 1 wherein said system includes a joint in a first generator which connects said electrodes of a same polarity to said connection members, a joint in a second generator which connects said connection members to electrodes of an opposite polarity, and a joint which connects said connection members of said first generator to said connection members of said second generator.

5. System according to claim 1 wherein at least one backing part is superposed on said connection members to be joined.

6. A system according to claim 1, wherein said joint is formed by an area of contact between said connection member and said electrodes, with said connection member having in said area of contact a first portion extending in a first direction and a second portion extending in a second direction substantially transverse to said first direction, and at least one of said electrodes joined to said connection member having a first portion extending in said first direction and in mechanical and electrical contact with said first portion of said connection member, said at least one electrode further having a second portion extending in said second direction and in mechanical and electrical contact with said second portion of said connection member.

7. A system according to claim 1, wherein a deformation joint connects together connection members from different generators.

8. A monoblock type nickel-cadmium accumulator battery for traction or emergency power comprising:

an electrical interconnection, including electrodes and connection members providing continuity of electrical current flow from the electrodes to an exterior of said accumulator, said electrodes being connected to said connection members by means of a mechanical and electrical joint, wherein each joint comprises a deformation area in which there is initially a substantially plane contact surface between a connection member and the electrodes to be joined, said connection member and the electrodes joined to it having been plastically deformed together in a common direction in said deformation area to form said joint, and wherein said joint is situated at a sufficient distance from edges of said electrodes and said connection members such that said edges are not deformed, said plastic deformation comprising cold flow of material of said electrodes and said connection members in parallel in said common direction, thereby immobilizing said electrodes and said connection members relative to each other, only said electrodes and said connection members contributing to said joint and being in intimate contact throughout the area subject to deformation.

9. A battery according to claim 8, wherein said joint is formed by an area of contact between said connection member and said electrodes, with said connection member having in said area of contact a first portion extending in a first direction and a second portion extending in a second direction substantially transverse to said first direction, and at least one of said electrodes joined to said connection member having a first portion extending in said first direction and in mechanical and electrical contact with said first portion of said connection member, said at least one electrode further having a second portion extending in said second direction and in mechanical and electrical contact with said second portion of said connection member.

10. A battery according to claim 8, wherein a deformation joint connects together connection members from different generators.

* * * * *